(12) United States Patent
Antoniazzi et al.

(10) Patent No.: US 12,087,074 B2
(45) Date of Patent: Sep. 10, 2024

(54) COMPUTER-IMPLEMENTED METHOD FOR READING A DIGITAL GRAPHICAL DIAGRAM REPRESENTING AN ELECTRIC CIRCUIT

(71) Applicant: ABB S.p.A., Milan (IT)

(72) Inventors: Antonello Antoniazzi, Milan (IT); Matteo Matteucci, Saronno (IT); Gabriele Perrone, Milan (IT)

(73) Assignee: ABB S.p.A., Milan (IT)

( * ) Notice: Subject to any disclaimer, the term of this patent is extended or adjusted under 35 U.S.C. 154(b) by 335 days.

(21) Appl. No.: 17/629,965

(22) PCT Filed: May 14, 2020

(86) PCT No.: PCT/EP2020/063517
§ 371 (c)(1),
(2) Date: Jan. 25, 2022

(87) PCT Pub. No.: WO2021/013399
PCT Pub. Date: Jan. 28, 2021

(65) Prior Publication Data
US 2022/0254181 A1    Aug. 11, 2022

(30) Foreign Application Priority Data

Jul. 25, 2019  (EP) ..................... 19188378

(51) Int. Cl.
G06V 30/422    (2022.01)
G06V 30/146    (2022.01)
G06V 30/412    (2022.01)

(52) U.S. Cl.
CPC ........ *G06V 30/422* (2022.01); *G06V 30/1473* (2022.01); *G06V 30/412* (2022.01)

(58) Field of Classification Search
None
See application file for complete search history.

(56) References Cited

U.S. PATENT DOCUMENTS 6,314,194 B1 * 11/2001 Michael ............... G06V 30/422
                                                   700/121
6,606,731 B1 *  8/2003 Baum ................... G06V 30/422
                                                   716/139

(Continued)

FOREIGN PATENT DOCUMENTS

EP       3104302 A1    12/2016

OTHER PUBLICATIONS

PCT International Search Report and Written Opinion, Application No. PCT/EP2020/063517, dated Sep. 2, 2020, 14 pages.

(Continued)

*Primary Examiner* — Anand P Bhatnagar
(74) *Attorney, Agent, or Firm* — McCarter & English, LLP

(57) ABSTRACT

A method for reading a digital graphical diagram representing an electric circuit is provided. The graphical diagram includes one or more diagram pages, each representing a portion of the electric circuit. The method includes for each diagram page detecting the graphical objects included in the diagram page, for each diagram page basing on the detected graphical objects, obtaining predictive information related to the components included in the portion of electric circuit represented in the diagram page, and for each diagram page harmonizing the predictive information related to the components of the portion of electric circuit represented in the diagram page to obtain an identification list of the components of the electric circuit.

20 Claims, 8 Drawing Sheets

(56) References Cited

U.S. PATENT DOCUMENTS

| | | | | |
|---|---|---|---|---|
| 7,499,601 B2* | 3/2009 | Nuno | ................... | G06Q 10/06 |
| | | | | 382/305 |
| 7,613,729 B2* | 11/2009 | Nuno | ................... | G06F 16/88 |
| 7,673,275 B2* | 3/2010 | Jones | ................... | G06F 30/30 |
| | | | | 716/117 |
| 7,895,560 B2* | 2/2011 | Lovell | ................... | G06F 15/76 |
| | | | | 708/130 |
| 7,957,150 B2* | 6/2011 | Osaka | ................ | H05K 3/0005 |
| | | | | 324/750.01 |
| 8,676,559 B2* | 3/2014 | Sethuraman | ............ | G06F 30/31 |
| | | | | 716/111 |
| 10,649,666 B1* | 5/2020 | Shih | ................... | G06F 3/0611 |
| 11,194,474 B1* | 12/2021 | Shih | ................... | G06F 3/0655 |
| 2010/0250622 A1* | 9/2010 | Hossenlop | ........... | G06V 30/422 |
| | | | | 707/E17.044 |
| 2011/0209081 A1* | 8/2011 | Chen | ................... | G06F 30/18 |
| | | | | 715/848 |
| 2014/0236322 A1 | 8/2014 | Eldridge | | |

OTHER PUBLICATIONS

European Extended Search Report, Application No. 19188378.4, dated Jan. 29, 2020, 7 pps.

Yuhong Yu et al., "A System for Recognizing a Large Class of Engineering Drawings", IEEE Transactions on Pattern Analysis and Machine Intelligence, IEEE Computer Society, USA., vol. 19, No. 8, Aug. 1997, pp. 868-890, XP000703341.

Indian Office Action for Patent Application No. 202247009307, dated Jul. 14, 2022, 6 pages.

* cited by examiner

COMPUTER-IMPLEMENTED METHOD FOR READING A DIGITAL GRAPHICAL DIAGRAM REPRESENTING AN ELECTRIC CIRCUIT

CROSS REFERENCE TO RELATED APPLICATIONS

This patent application is a National Stage Entry of PCT/EP2020/063517 filed on May 14, 2020, which claims the benefit and priority of European Patent Application No. 19188378.4 filed on Jul. 25, 2019, the disclosures of which are incorporated by reference herein in their entirety as part of the present application.

BACKGROUND

The present disclosure relates to a method for reading a digital graphical diagram including an electric circuit, for example an electric power distribution grid.

As is known, an electric circuit, such as an electric power distribution grid, may be graphically described in digital format using different semantics for representing the electrical components and the electrical connections of the electric circuit.

In general, information content and graphical symbols adopted in a graphical diagram depend on the software program used to design the electric circuit and/or on the personal choice of the circuit designer.

Examples of different digital graphical diagrams representing electric circuits are schematically shown in FIGS. 1-3. It is apparent how each graphical diagram includes different information content and adopts a different semantics to represent components and their electrical connections.

Graphical diagrams related to electric circuits need often to be combined, updated, or further processed, e.g. for the purpose of generating a BOM (Bill of Materials) or preparing a commercial offer related to an electric power distribution plant to be installed.

Nowadays, due to the available variety of information details and semantics to describe electric circuits, all these activities generally entail the intervention of highly specialized and skilled personnel and are time-consuming/expensive to carry out.

BRIEF DESCRIPTION

Embodiments of the present disclosure provide a method for reading a digital graphical diagram including an electric circuit, which allows solving or mitigating the technical problems evidenced above.

One embodiment of the present disclosure provides a method that allows collecting information about the structure of an electric circuit represented in a digital graphical diagram in a quick and effective way.

Another embodiment of the present disclosure provides a method that can be easily carried out even by non-specialized operators.

Another embodiment of the present disclosure provides a method that can be easily computer-implemented without the adoption of expensive processing resources.

These embodiments of the present disclosure are achieved by a method for reading a digital graphical diagram including an electric circuit, according to the following claim 1 and the related dependent claims.

In a general definition, the method, according to the disclosure, includes the following steps:

for each diagram page, detecting the graphical objects included in said diagram page;

for each diagram page, basing on the detected graphical objects, obtaining predictive information related to the components included in the portion of electric circuit represented in said diagram page; and for each diagram page, harmonizing predictive information related to the components of the portion of electric circuit represented in said diagram page and providing an identification list of the components said electric circuit.

According to an aspect of the present disclosure, the step of detecting the graphical objects included in each said diagram page includes obtaining identification data related to the detected graphical objects. Said identification data conveniently include predictive information related to the class, the position, and the size of the detected graphical objects.

According to an aspect of the present disclosure, the step of obtaining predictive information related to the components of the portion of electric circuit represented in said diagram page includes merging and harmonizing the identification data related to the detected graphical objects of said diagram page.

According to an aspect of the present disclosure, the step of obtaining predictive information related to the components of the portion of electric circuit represented in said diagram page includes detecting one or more graphical connectors among detected component objects of said diagram page.

According to an aspect of the present disclosure, the step of obtaining predictive information related to the components of the portion of electric circuit represented in said diagram page includes assigning one or more detected text objects or table objects of said diagram page to one or more detected component objects of said diagram page.

According to an aspect of the present disclosure, the method includes a step of obtaining, for each diagram page, one or more first crop portions of said diagram page. Each first crop portion includes partially overlapped regions of the corresponding diagram page.

According to an aspect of the present disclosure, the method includes a step of obtaining, for each diagram page, additional predictive information related to the components of the portion of electric circuit represented in said diagram page.

Such a step of obtaining additional predictive information includes:

for each diagram page, obtaining one or more second crop portions of said diagram page, said second crop portions being formed by text areas or table areas of said graphical diagram at said diagram page;

for each diagram page, detecting text strings included in the second crop portions of said diagram page; and for each diagram page, basing on the detected text strings, obtaining predictive information related to assigning one or more detected text objects or table objects included in said diagram page to one or more detected component objects of said diagram page.

According to an aspect of the present disclosure, the method includes a step of pre-processing a graphical file including said graphical diagram in digital format.

Such a pre-processing step includes:

converting said graphical file into a first image file including said graphical diagram in digital format;

splitting said first image file into one or more second image files, each including a diagram page in digital format; and if necessary, reducing the size of said second image files.

The above-mentioned step of obtaining the first crop portions of a diagram page may include splitting a second image file related to said diagram page into a batch of third image files, each including a first crop portion said diagram page in digital format.

The above-mentioned step of obtaining the second crop portions of a diagram page may include splitting a second image file related to said diagram page into a batch of fourth image files, each including a second crop portion of said diagram page in digital format.

According to an aspect of the present disclosure, the method includes a step of extracting, from the above-mentioned identification list, information about the properties of the components included of said electric circuit.

The method, according to the present disclosure, is apparently intended for a computer-implementation. In some further aspects, the present disclosure thus relates to a computer program, according to the following claim 13, and to a computerized device or platform, according to the following claim 14.

BRIEF DESCRIPTION OF THE DRAWINGS

Further characteristics and advantages of the present disclosure will emerge more clearly from the description of example, but not exclusive embodiments, of which non-limiting examples are shown in the attached drawings, in which.

DETAILED DESCRIPTION

With reference to the above-mentioned figures, the present disclosure refers to a method 1 for reading a graphical diagram 100 in digital format, which represents an electric circuit.

In principle, the above-mentioned electric circuit may be of any type.

The method, according to the disclosure, is however particularly adapted for reading graphical diagrams related to extended electric power distribution grids.

The graphical diagram 100 includes one or more diagram pages, each representing a portion of the electric circuit represented.

Figure 1:
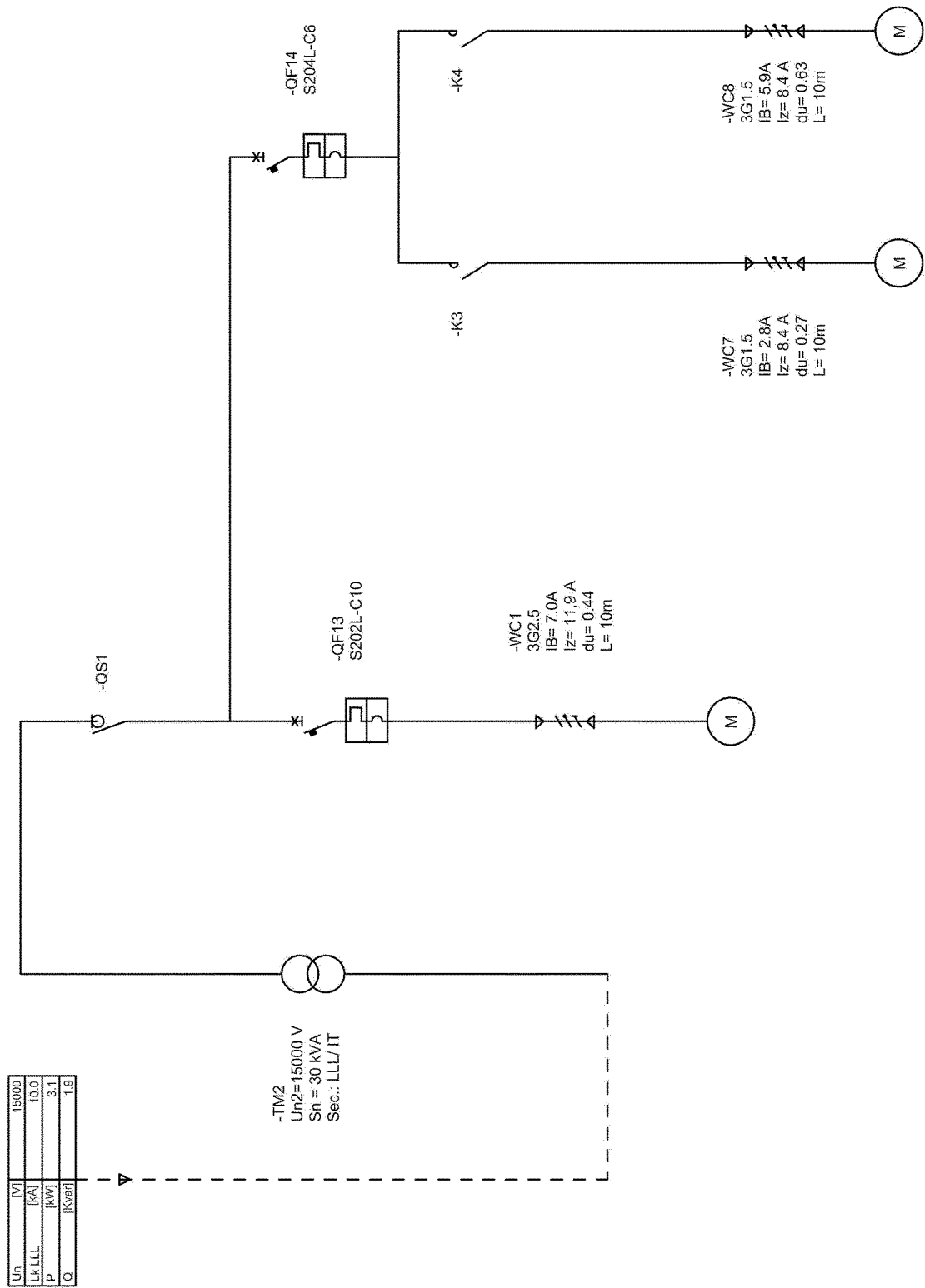
FIGS. 1-3 are schematic views showing different types of digital graphical diagrams representing electric circuits.
Figure 2:
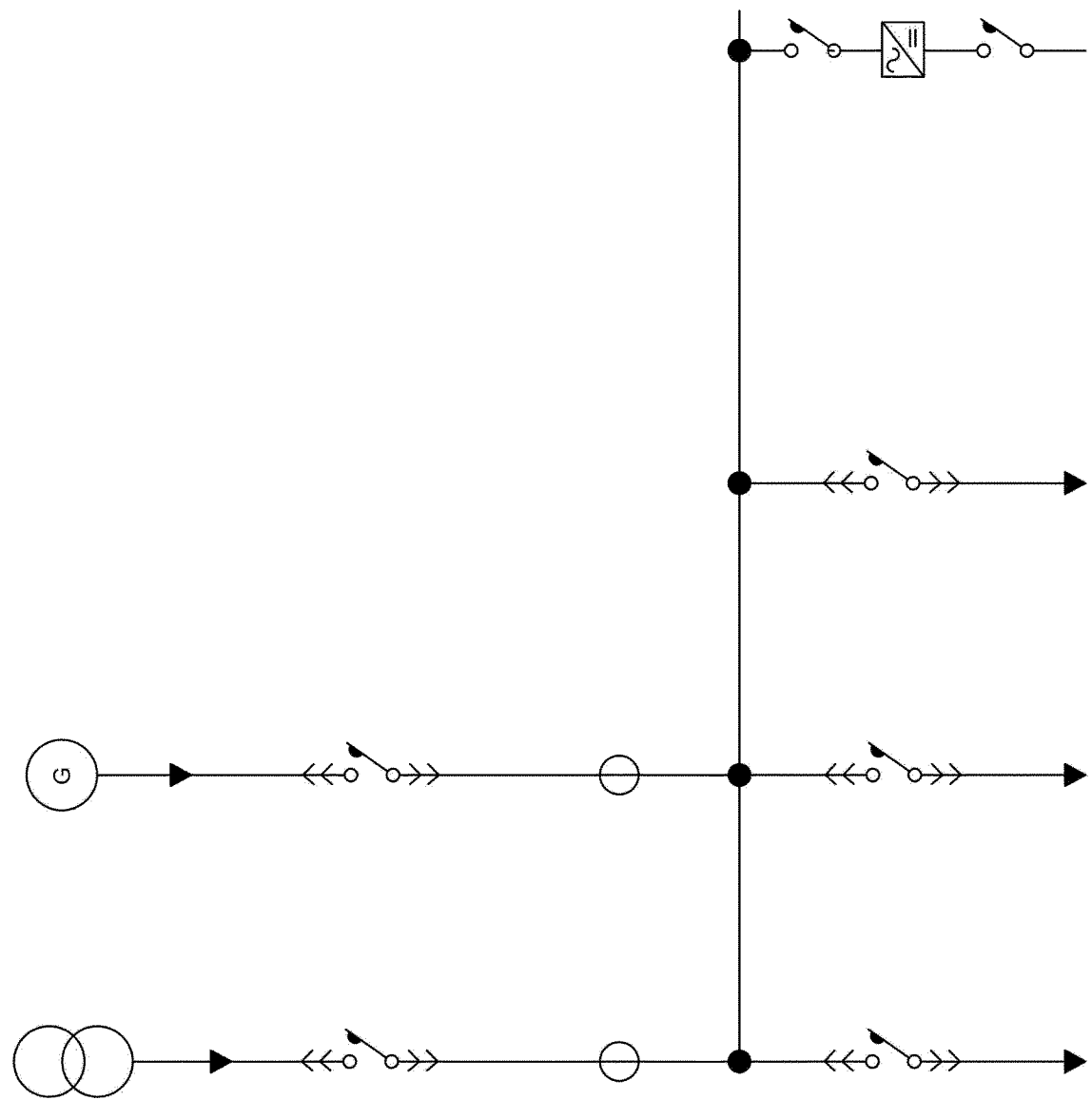
Figure 3:
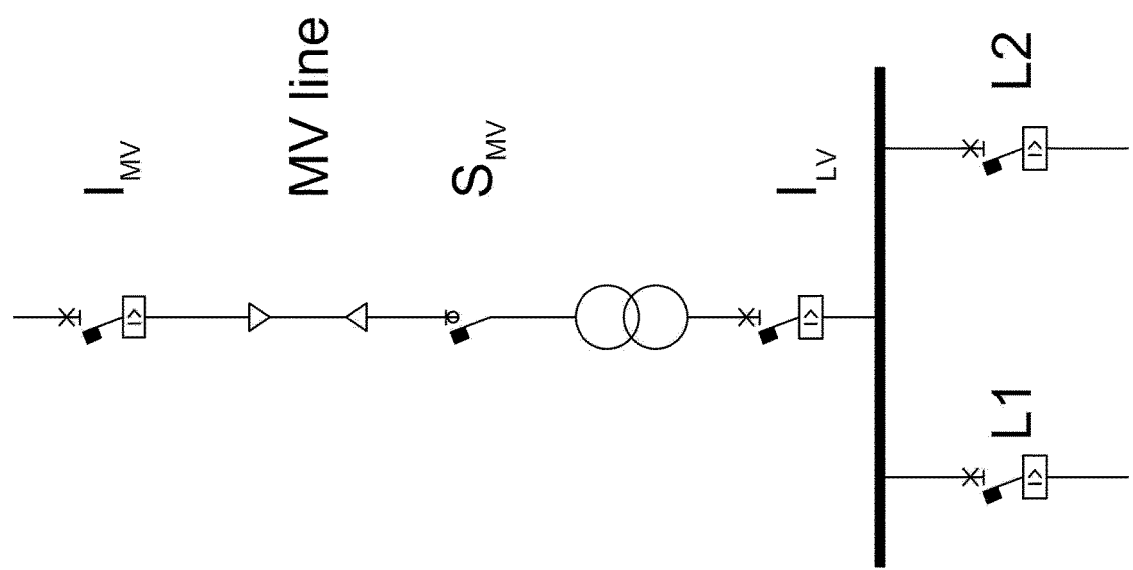
Figure 4:
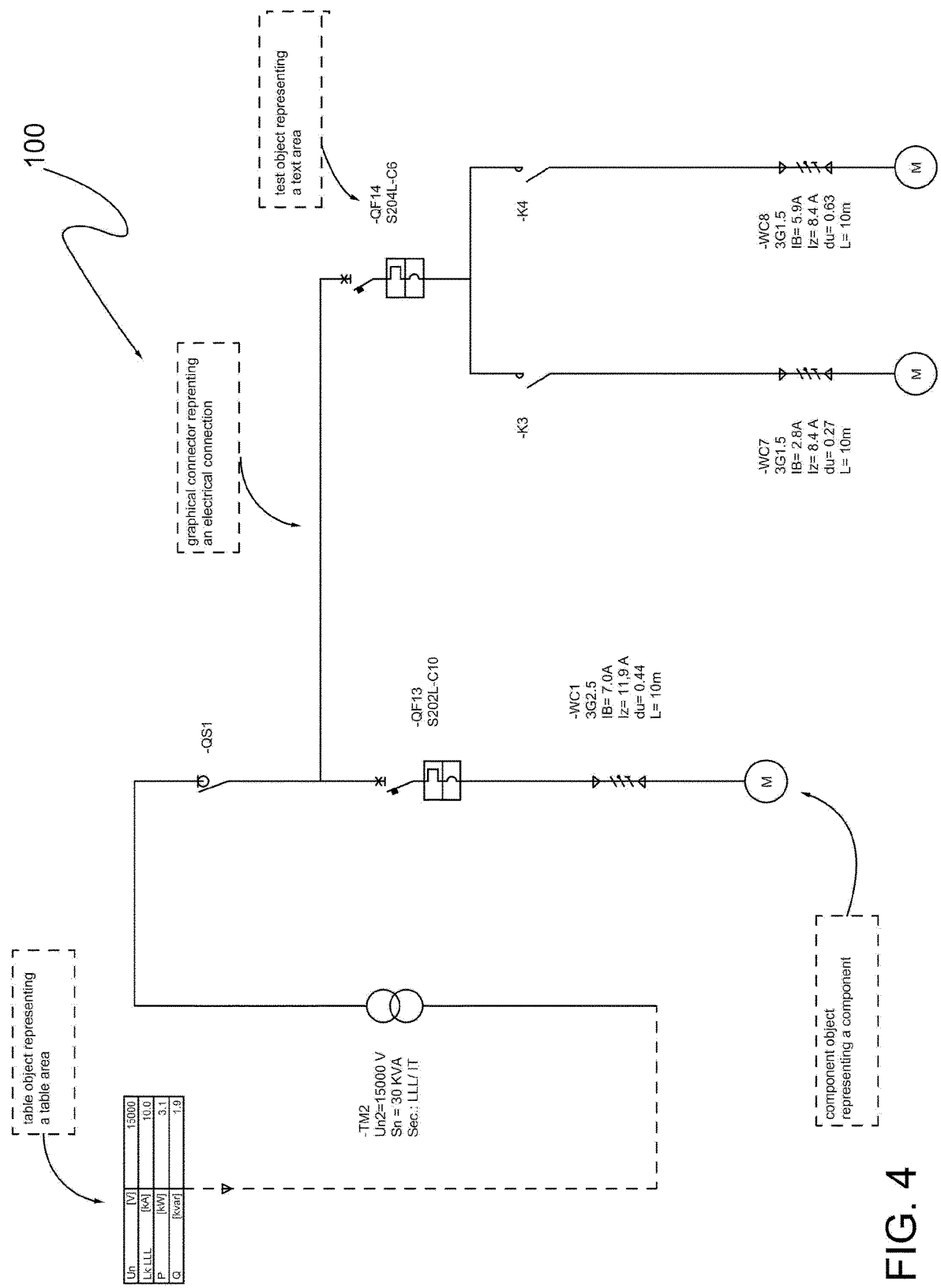
FIGS. 4-8 are schematic views showing the steps of the method, according to the present disclosure.

An example of graphical diagram is shown in FIG. 4. In this case, the graphical diagram 100 includes a single page only.

In practical applications, however, the graphical diagram 100 may have a huge number (e.g. some tens) of diagram pages.

In general, the graphical diagram 100 may adopt a variety of graphical symbols of different types to represent components of an electric circuit and their electrical connections.

However, regardless of the semantics used to represent said components and electrical connections, each diagram page of the graphical diagram 100 may include one or more graphical objects and one or more graphical connectors (shown in FIG. 4).

Graphical objects of the graphical diagram 100 generally relate to components of the electric circuit, text areas, or table areas of said the graphical diagram. The graphical diagram 100 thus includes one or more of the following graphical objects: component objects, text objects, and table objects.

Component objects of the graphical diagram 100 generally represent corresponding components of the represented electric circuit (e.g. an electric load, a circuit breaker, a transformer, and the like).

Text objects of the graphical diagram 100 generally represent corresponding text areas of said graphical diagram.

Table objects of the graphical diagram 100 generally represent corresponding text areas of said graphical diagram.

All these graphical objects may have different size and configuration depending on the type of the circuit components and on the semantics used to graphically represent said components.

Graphical connectors of the graphical diagram 100 generally relate to electrical connections among two or more components of the represented electric circuit.

Each graphical connector may be represented as a single line linking at least two component objects of the graphical diagram.

The steps of the method 1, according to the disclosure, will be now described in details with reference to its implementation by a computerized device or platform.

According to an example embodiment of the disclosure, the method 1 includes a preliminary step 17 of pre-processing a graphical file including the graphical diagram 100 in digital format.

Conveniently, the graphical file may of the ".pdf" or ".dxg" type or other similar graphical format.

The preliminary step 17 of the method 1 may include a sub-step of converting the above-mentioned graphical file into a first image file, e.g. of the ".jpg" or ".png" type or other similar image format. In this way, the above-mentioned graphical file is converted into a readable matrix of pixels, which is more adapted for being further processed.

The preliminary step 17 of the method 1 may include a sub-step of splitting the above-mentioned first image file into one or more second image files, each including a diagram page of the graphical diagram 100.

This solution allows remarkably reducing the computational load required to carry out the following main steps of method 1.

In order to further reduce such a computational load, the preliminary step 17 of the method 1 may include a sub-step of reducing, if necessary, the size of one or more second image files obtained at the previous splitting step.

Conveniently, image files representing diagram pages of the graphical diagram 100, which are too huge for being processed in a reasonable time, are resized to maximum predefined dimensions.

Figure 5:
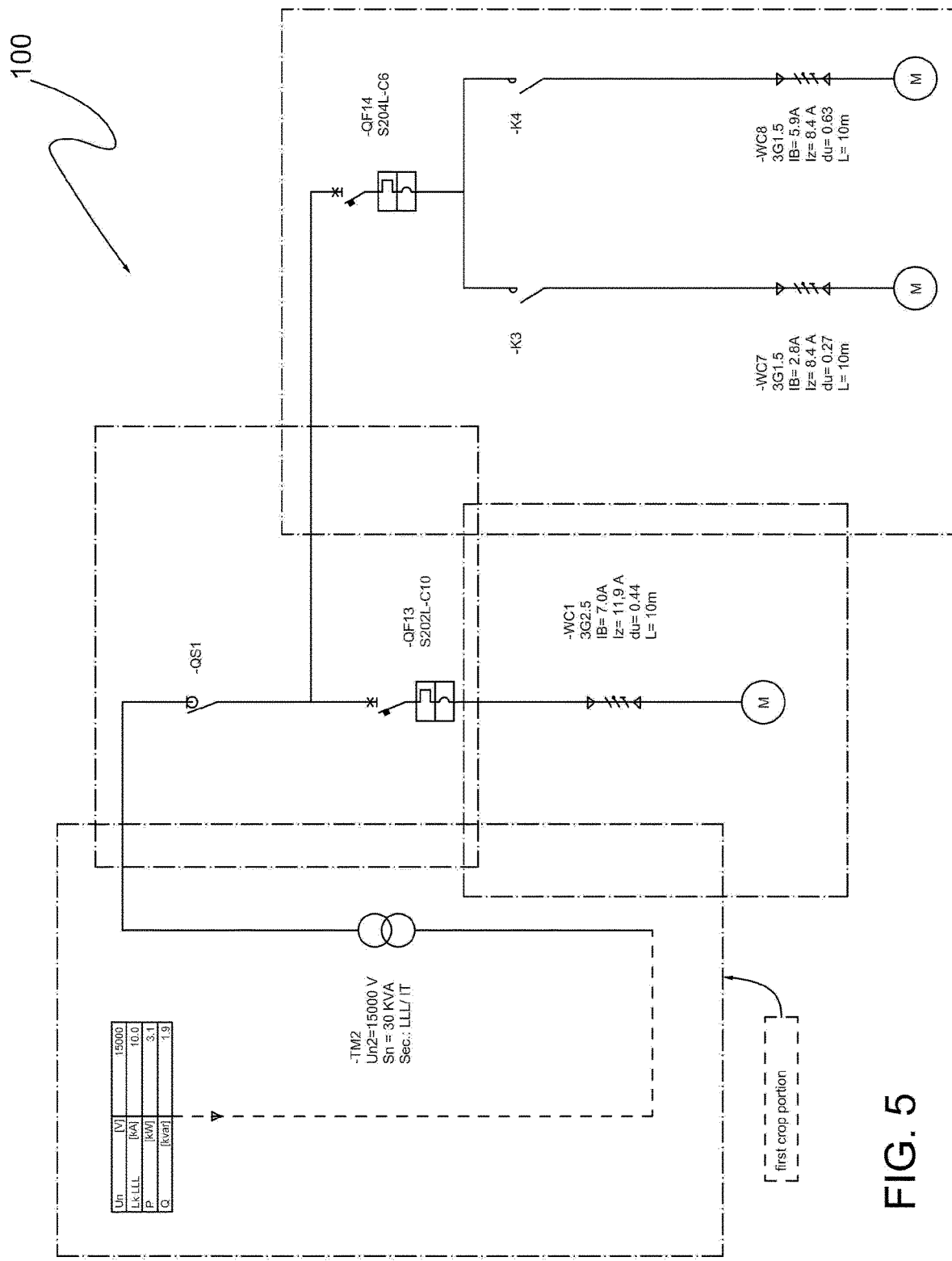

According to an example embodiment of the disclosure, the method 1 includes a step 11 of obtaining, for each diagram page of the graphical diagram 100, one or more first crop portions of said diagram page (shown in FIG. 5).

Conveniently, the first crop portions obtained for each diagram page are selected in such a way to include partially overlapped regions of said diagram page. In this way, the probability of missing graphical information located at the borders of the first crop portions is remarkably reduced.

Obviously, as shown in FIG. 5, the first crop portions obtained for each diagram page are tailored in such a way that they cover the whole image represented in a diagram page.

In a practical implementation of the method 1, the first crop portions of each diagram page are obtained by cropping each second image file related to said diagram page. In this way, a batch of third image files, each including a first crop portion in digital format, is obtained.

The obtaining of the above-mentioned first crop portions is basically directed to dramatically reduce the computational load required for detecting graphical objects and the graphical connectors in each diagram page of the graphical diagram 100.

The computational load related to the detection process of the graphical objects included in each diagram page, and more generally in the graphical diagram 100, can in fact be parallelized among a number of smaller images, which can be processed more easily.

Figure 6:
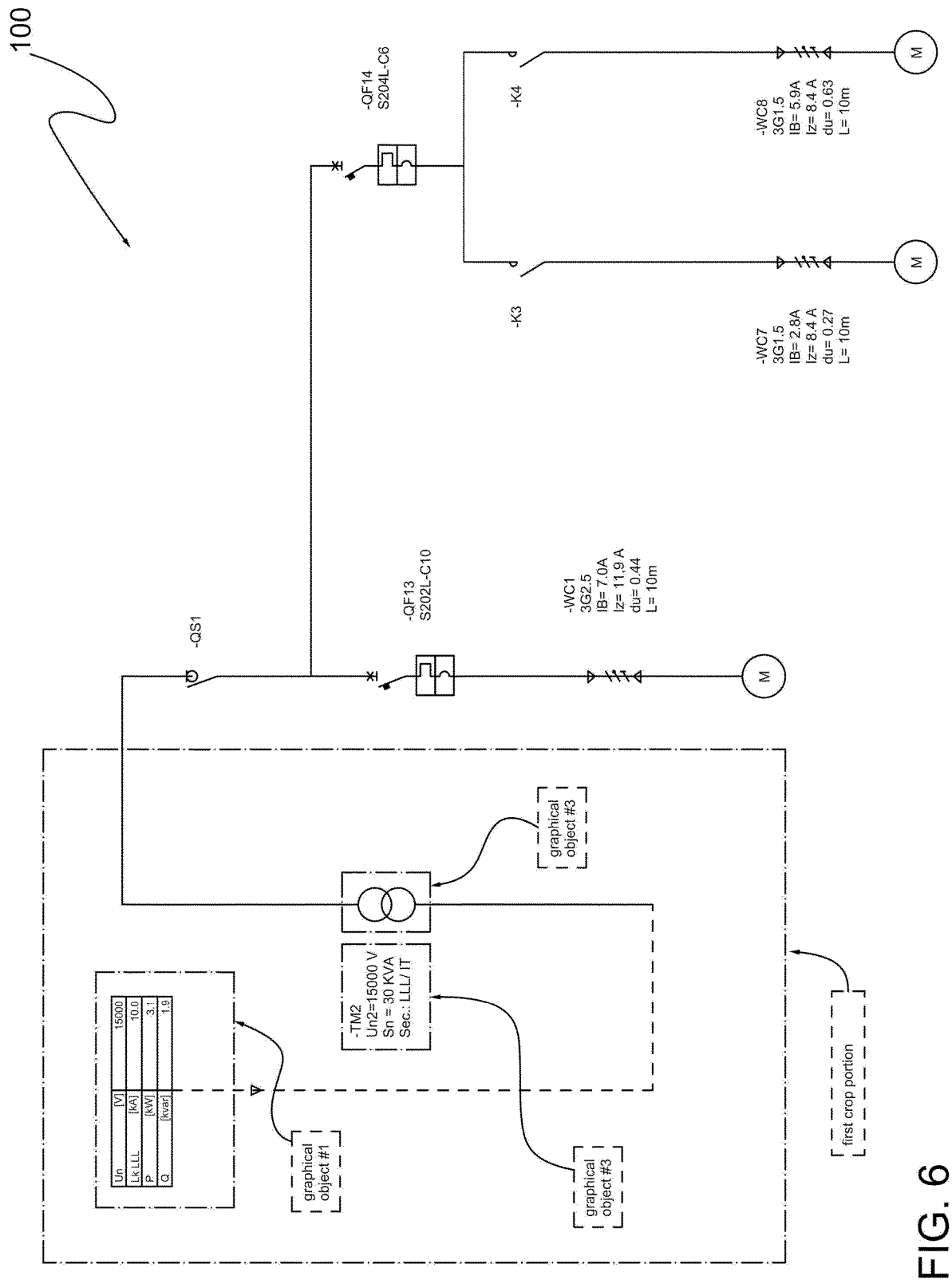

According to the disclosure, the method 1 includes a step 12 of detecting, for each diagram page of the graphical diagram 100, the graphical objects included in said diagram page, may be in the first crop portions of said diagram page (shown in FIG. 6).

As shown in FIG. 6, detected graphical objects may be component objects, text objects, or table objects.

The detection step 12 may include obtaining identification data related to the repeatedly detected graphical objects of each first crop portion.

These identification data include predictive information related to the class (e.g. the type) of each detected graphical object, the position of each detected graphical object and the size of each detected graphical object.

Referring to FIG. 6, practical examples of said identification data may be the following:

{detected graphical object #1: class (table area), position (x1, y1), size (S1)};
{detected graphical object #2: class (circuit breaker), position (x2, y2), size (S2)};
{detected graphical object #3: class (text area), position (x3, y3), size (S3)}.

In a practical implementation of the method 1, the detection step 12 may be carried out by exploiting suitable TM (Template Matching) algorithms, which may be of known type. As an alternative, expert systems employing suitably trained neural networks may be used.

According to the disclosure, the method 1 includes a step 13 of obtaining, for each diagram page of the graphical diagram 100, basing on the detected graphical objects, predictive information related to the components included in the portion of electric circuit represented in said diagram page.

In one aspect, the step 13 of the method 1 is directed to assemble and optimize the predictive information collected at the previous detection step 12 of the method 1.

The step 13 of the method 1 may include a sub-step of merging and harmonizing, for each diagram page of the graphical diagram 100, the identification data related to the detected graphical objects of said diagram page.

Such a merge and harmonization step may include converting the position coordinates of the detected graphical objects (which are normally referred to the reference system of the respective first crop portion) into absolute position coordinates referred to the reference system of the diagram page.

In a practical implementation of the method 1, such a conversion process may be easily carried out by exploiting suitable conversion algorithms, which may be of known type.

Such a merge and harmonization step may include deleting duplicated identification data related to identical detected graphical objects of each diagram page. Such a filtering process is made necessary by the circumstance that a same graphical object may be detected many times, e.g. at adjacent overlapped first crop portions.

In practice, for each diagram page of the graphical diagram 100, the predictive information resulting from such a filtering process will be given by the difference between the union and the intersection of the predictive information included in the data related to the detected graphical objects in said diagram page.

In another aspect, the step 13 of the method 1 is directed to integrate the predictive information collected at the previous detection step 12 of the method 1.

The step 13 of the method 1 may include a sub-step of detecting one or more graphical connectors among two or more detected component objects included in said diagram page.

In this way, for each diagram page, it is possible to collect predictive information on how the components of the portion of electric circuit represented in said diagram page are operatively connected.

In a practical implementation of the method 1, such a detection process may be carried out through suitable feature extraction algorithms of known type, such as LSD (Line Segment Detection) algorithms, HT (Hough Transform) algorithms, or DSCC (Directional Singly Connected Chain) algorithms. As an alternative, expert systems employing suitably trained neural networks may be used.

In yet another aspect, the step 13 of the method 1 is directed to structure the predictive information collected at the previous detection step 12 of the method 1 in such a way to reconstruct the whole information content of each diagram page.

The step 13 of the method 1 may include a sub-step of assigning, for each diagram page, one or more detected text objects or table objects included in said diagram page to one or more detected component objects included in said diagram page.

Such an assignment process may be carried out according to a variety of different criteria.

As an example, proximity criteria may be used: a detected text object or a table object of diagram page (representing a text area or a table area of the diagram page) will thus be assigned to the nearest component object of said diagram page (representing a component of the electric circuit portion represented in the diagram page).

It is evident how the above-described assignment process is directed to associate, for each diagram page, each text area or table area of said diagram page to the correct component of the electric circuit portion represented in said diagram page.

According to an example embodiment of the disclosure, the method 1 includes a step 16 of obtaining, for each diagram page, additional predictive information related to the components of the portion of electric circuit represented in said diagram page.

The step 16 of the method 1 is conveniently directed to recover additional information contents about the components of the portion of electric circuit represented in each diagram page. Such additional information contents may be used to improve the quality of the predictive information collected at the previously-described steps 12-13 of the method 1.

Figure 7:
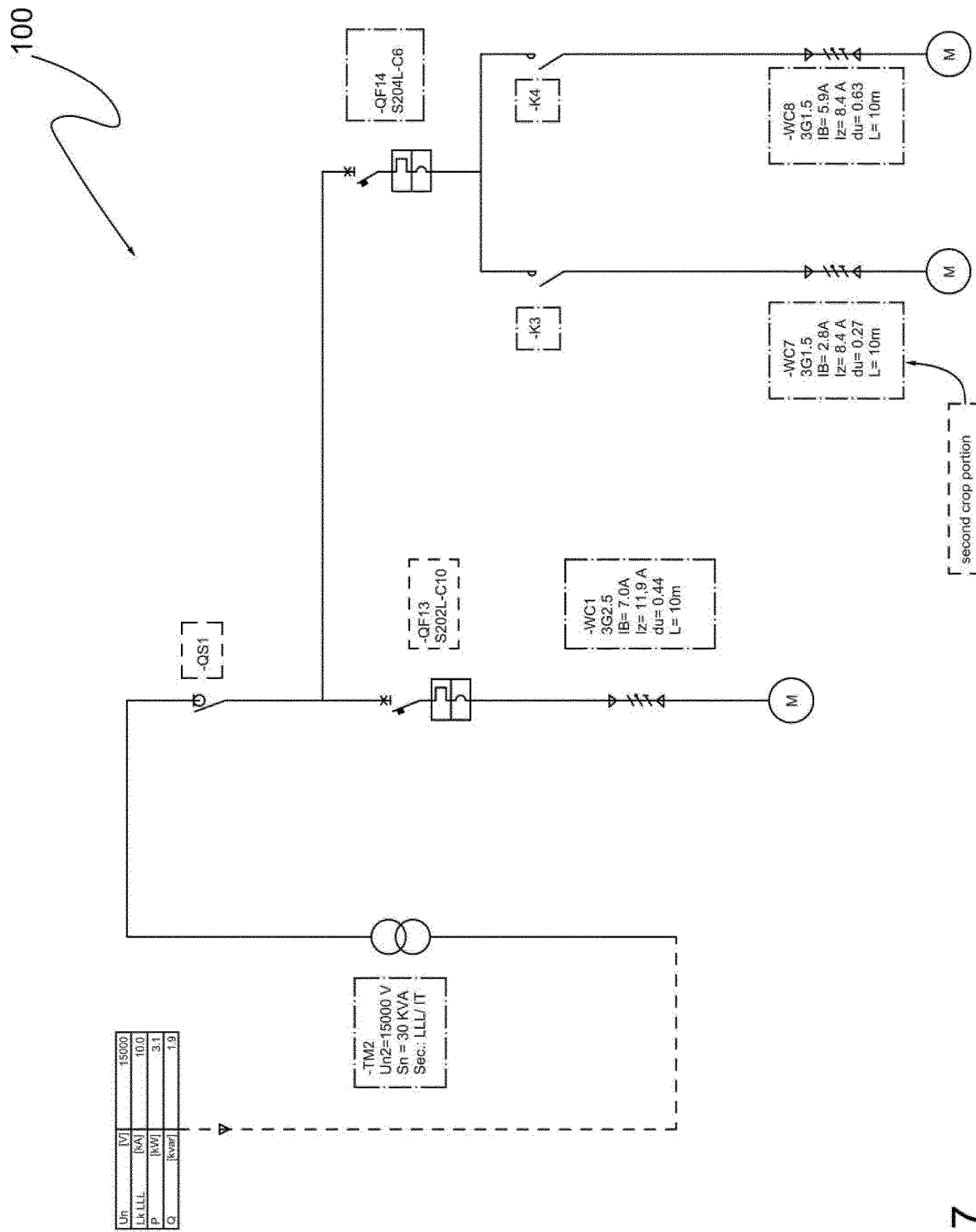
Figure 8:
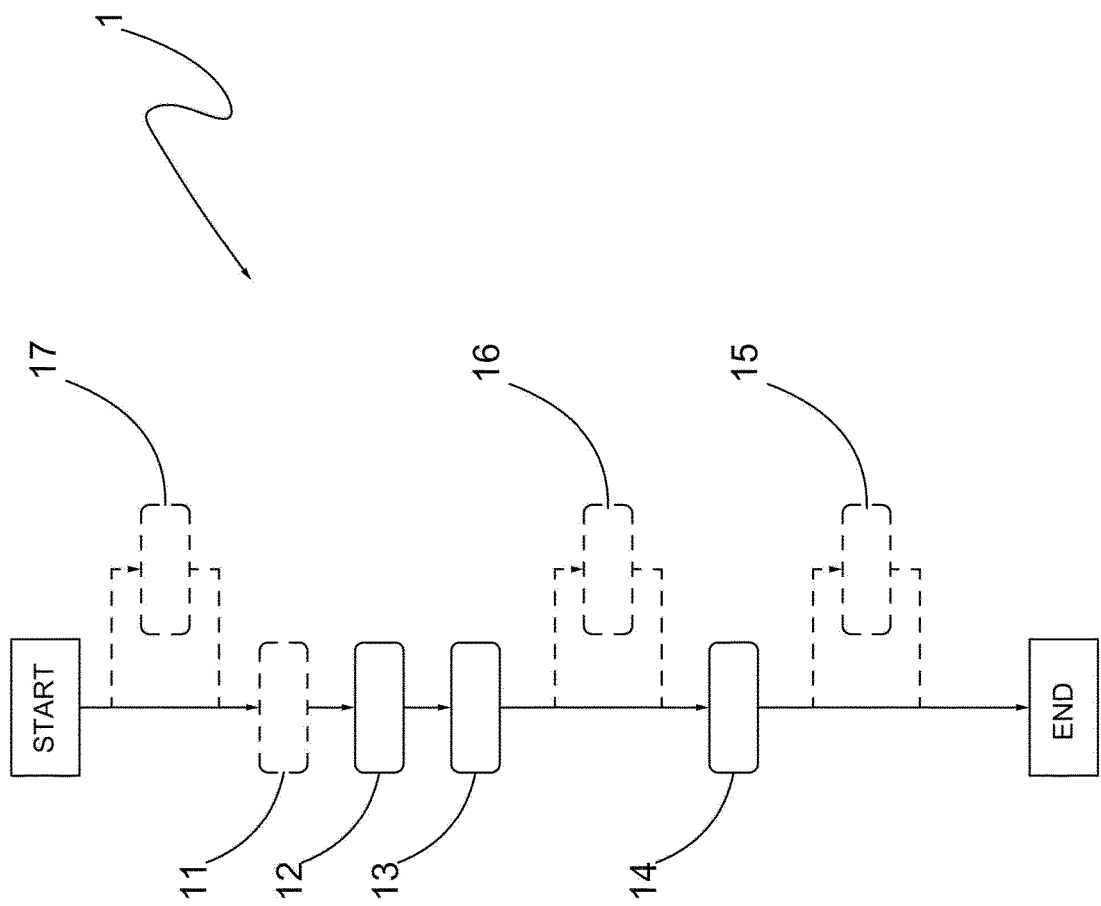

The step 16 includes a sub-step of obtaining, for each diagram page, one or more second crop portions of said diagram page, which are formed by text areas or table areas of the graphical diagram 100 at said diagram page (shown in FIG. 7).

Conveniently, the second crop portions obtained for each diagram page are tailored in such a way to include only text areas or table areas of the graphical diagram 100.

In practical implementation of the method 1, the second crop portions of each diagram page are obtained by cropping each second image file related to said diagram page. In this way, for each diagram page, a batch of fourth image files, each including a second crop portion in digital format, is obtained.

For each diagram page, such a batch of fourth image files can thus be easily processed to extract the information content of each text area or table area of the graphical diagram 100.

The step 16 may include a sub-step of detecting, for each diagram page, the text strings included in each second crop portion of said diagram page.

In a practical implementation of the method 1, such a detection process may be carried out through suitable OCR (Optical Character Recognition) algorithms of known type.

The step 16 may include a sub-step of obtaining, for each diagram page, basing on the detected text strings obtained through the above-mentioned detection process, predictive information related to the assignment of a detected text object or table object of said diagram page to a detected component object included in said diagram page.

In a practical implementation of the method 1, such a string analysis process may be easily carried out using suitable probabilistic classifiers (e.g. Naive-Bayes classifiers) or probabilistic decision networks (e.g. Bayesan networks), which may be of known type.

As an alternative known RegEx (Regular Expressions) extraction algorithms suitable to extract information from the detected text strings may be used.

The additional predictive information collected at the step 16 of the method 1 allows improving the assignment of a detected text object or table object of each diagram page to a detected component object included in said diagram page.

A detected text object or a table object of diagram page may be assigned to a component object of said diagram page basing on the information contained in said text object or table object and extracted from the text strings detected in said text object or table object.

According to the disclosure, the method 1 includes a step 14 of harmonizing, for each diagram page, the predictive information related to the components of the portion of electric circuit represented in said diagram page.

Predictive information related to the components of the portion of electric circuit represented in said diagram page, which has been collected at the previously described steps 12, 13 and, possibly, 16, of the method 1, may in fact be contradictory or inhomogeneous.

The step 14 of the method 1 is thus directed to filter the collected pieces of information in order to eliminate or reduce possible discrepancies.

In a practical implementation of the method 1, such a string analysis process may be carried out basing suitable known selection algorithms based on predefined rules, e.g. upon assignment a priority level to each collected piece of information.

As an alternative, Machine Learning or Graph Network algorithms of known type may be conveniently used.

Conveniently, the step 14 of the method 1 includes providing an identification list of the components of the electric circuit represented in the graphical diagram 100.

Such an identification list conveniently also includes information about the related electrical connections and about the text areas or table areas assigned to said components.

According to an example embodiment of the disclosure, the method 1 includes a step 15 of extracting from the above-mentioned identification list information about the properties of the components included of said electric circuit.

Conveniently, such an extraction steps may be carried out by analyzing the text strings associated to each component of the electric circuit. To this aim, known RegEx (Regular Expressions) extraction algorithms may be used.

It is apparent from the above how the step 15 of the method 1 is directed to improve the quality of information derivable from the graphical diagram 100 by automatically inferring information that is implicitly contained in text areas or table areas of the graphical diagram itself.

The method 1, according to the disclosure, is particularly suitable for being implemented by a computerized device or platform.

In a further aspect, the present disclosure thus relates to a computerized device or platform is provided with processing resources capable of executing software instructions stored or storable in a storage medium to implement the method, according to the disclosure.

Such a computerized device or platform may be of any type, e.g. a desktop or portable computerized device, a server platform, a cloud-computing platform, and the like.

In yet a further aspect, the present disclosure thus relates to a computer program including software instructions stored or storable in a storage medium to implement the method, according to the disclosure, when executed by a computerized device or platform.

The method 1, according to the disclosure, allows fully satisfying the above-mentioned aim and objects.

The method allows collecting information about the structure of an electric circuit represented in a digital graphical diagram in a quick and effective way, regardless of the semantics used for representing the electrical components and the electrical connections of said electric circuit.

Graphical diagrams representing electric circuits may thus be analyzed uniformly and with a high level of accuracy, independently of the specific skills or experience of the operator.

The method is particularly suitable for implementation at industrial level by means of a computerized device or platform without requiring particularly powerful and expensive data processing resources.

The invention claimed is:

1. A method for reading a digital graphical diagram representing an electric circuit, the graphical diagram including one or more diagram pages, each representing a portion of the electric circuit,
    wherein each diagram page includes one or more graphical objects and one or more graphical connectors,
    wherein each graphical object is formed by a component object representing a component of the electric circuit or by a text object representing a text area of the graphical diagram or by a table object representing a table area of the graphical diagram, and
    wherein each graphical connector represents an electrical connection linking at least two components of the electric circuit,
    the method comprising:
        for each diagram page, detecting the graphical objects included in the diagram page;

for each diagram page, basing on the detected graphical objects, obtaining predictive information related to the components included in a portion of electric circuit represented in the diagram page; and for each diagram page, harmonizing predictive information related to the components of the portion of electric circuit represented in the diagram page and providing an identification list of the components of the electric circuit, wherein the method further comprises pre-processing a graphical file including the graphical diagram in digital format by:

converting the graphical file into a first image file including the graphical diagram in digital format;

splitting the first image file into one or more second image files, each including a diagram page in digital format; and if necessary, reducing a size of the second image files.

2. The method according to claim 1, wherein the method further comprises extracting, from the identification list, information about properties of the components included of the electric circuit.

3. The method according to claim 1, wherein detecting the graphical objects included in the diagram page includes obtaining identification data related to the detected graphical objects, the identification data including predictive information related to class, position, and size of the detected graphical objects.

4. The method according to claim 3, wherein obtaining predictive information related to the components included in a portion of electric circuit represented in the diagram page includes merging and harmonizing the identification data related to the detected graphical objects of the diagram page.

5. The method according to claim 1, wherein obtaining predictive information related to the components included in a portion of electric circuit represented in the diagram page includes detecting one or more graphical connectors among detected component objects of the diagram page.

6. The method according to claim 1, wherein obtaining predictive information related to the components included in a portion of electric circuit represented in the diagram page includes assigning one or more detected text objects or table objects of the diagram page to one or more detected component objects of the diagram page.

7. The method according to claim 1, wherein the method further comprises obtaining, for each diagram page, one or more first crop portions of the diagram page, the first crop portions including partially overlapped regions of the diagram page.

8. The method according to claim 7, wherein obtaining one or more first crop portions of the diagram page includes splitting a second image file related to the diagram page into a batch of third image files, each including a first crop portion of the diagram page in digital format.

9. The method according to claim 1, wherein the method further comprises obtaining, for each diagram page, additional predictive information related to the components of the portion of electric circuit represented in the diagram page by:

for each diagram page, obtaining one or more second crop portions of the diagram page, the second crop portions formed by text areas or table areas of the graphical diagram at the diagram page;

for each diagram page, detecting text strings included in the second crop portions of the diagram page; and for each diagram page, basing on the detected text strings, obtaining predictive information related to assigning one or more detected text objects or table objects included in the diagram page to one or more detected component objects of the diagram page.

10. The method according to claim 9, wherein obtaining one or more second crop portions of the diagram page includes splitting a second image file related to the diagram page into a batch of fourth image files, each including a second crop portion of the diagram page in digital format.

11. The method according to claim 1, wherein the electric circuit is an electric power distribution grid.

12. The method of claim 1, wherein harmonizing the predictive information further comprises converting position coordinates of the detected graphical objects into absolute position coordinates.

13. One or more non-transitory machine-readable storage media for reading a digital graphical diagram representing an electric circuit, the graphical diagram including one or more diagram pages, each representing a portion of the electric circuit, wherein each diagram page includes one or more graphical objects and one or more graphical connectors, wherein each graphical object is formed by a component object representing a component of the electric circuit or by a text object representing a text area of the graphical diagram or by a table object representing a table area of the graphical diagram, and wherein each graphical connector represents an electrical connection linking at least two components of the electric circuit, the one or more non-transitory machine-readable storage media comprising a plurality of instructions stored thereon that, in response to being executed, cause a system to:

for each diagram page, detect the graphical objects included in the diagram page;

for each diagram page, based on the detected graphical objects, obtain predictive information related to the components included in a portion of electric circuit represented in the diagram page; and for each diagram page, harmonize predictive information related to the components of the portion of electric circuit represented in the diagram page and provide an identification list of the components of the electric circuit, wherein the plurality of instructions further cause the system to:

pre-process a graphical file including the graphical diagram in digital format by:

converting the graphical file into a first image file including the graphical diagram in digital format;

splitting the first image file into one or more second image files, each including a diagram page in digital format; and if necessary, reducing a size of the second image files.

14. The one or more non-transitory machine-readable storage media of claim 13, wherein the plurality of instructions further cause the system to:

obtain, for each diagram page, one or more first crop portions of the diagram page, the first crop portions including partially overlapped regions of the diagram page.

15. The one or more non-transitory machine-readable storage media of claim 13, wherein the plurality of instructions further cause the system to:

obtain, for each diagram page, additional predictive information related to the components of the portion of electric circuit represented in the diagram page by:

for each diagram page, obtaining one or more second crop portions of the diagram page, the second crop portions formed by text areas or table areas of the graphical diagram at the diagram page;

for each diagram page, detecting text strings included in the second crop portions of the diagram page; and for each diagram page, based on the detected text strings, obtaining predictive information related to assigning one or more detected text objects or table objects included in the diagram page to one or more detected component objects of the diagram page.

16. The one or more non-transitory machine-readable storage media of claim 13, wherein the plurality of instructions further cause the system to:

harmonize the predictive information by:
converting position coordinates of the detected graphical objects into absolute position coordinates.

17. A computerized device or platform for reading a digital graphical diagram representing an electric circuit, the graphical diagram including one or more diagram pages, each representing a portion of the electric circuit, wherein each diagram page includes one or more graphical objects and one or more graphical connectors, wherein each graphical object is formed by a component object representing a component of the electric circuit or by a text object representing a text area of the graphical diagram or by a table object representing a table area of the graphical diagram, and wherein each graphical connector represents an electrical connection linking at least two components of the electric circuit, wherein the computerized device or platform comprises at least one processor in communication with at least one memory device, the at least one processor programmed to:

for each diagram page, detect the graphical objects included in the diagram page;

for each diagram page, based on the detected graphical objects, obtain predictive information related to the components included in a portion of electric circuit represented in the diagram page; and for each diagram page, harmonize predictive information related to the components of the portion of electric circuit represented in the diagram page and provide an identification list of the components of the electric circuit, wherein the at least one processor is further programmed to:

pre-process a graphical file including the graphical diagram in digital format by:
converting the graphical file into a first image file including the graphical diagram in digital format;
splitting the first image file into one or more second image files, each including a diagram page in digital format; and if necessary, reducing a size of the second image files.

18. The computerized device or platform of claim 17, wherein the at least one processor is further programmed to:
obtain, for each diagram page, one or more first crop portions of the diagram page, the first crop portions including partially overlapped regions of the diagram page.

19. The computerized device or platform of claim 17, wherein the at least one processor is further programmed to:
obtain, for each diagram page, additional predictive information related to the components of the portion of electric circuit represented in the diagram page by:
for each diagram page, obtaining one or more second crop portions of the diagram page, the second crop portions formed by text areas or table areas of the graphical diagram at the diagram page;
for each diagram page, detecting text strings included in the second crop portions of the diagram page; and
for each diagram page, based on the detected text strings, obtaining predictive information related to assigning one or more detected text objects or table objects included in the diagram page to one or more detected component objects of the diagram page.

20. The computerized device or platform of claim 17, wherein the at least one processor is further programmed to:
harmonize the predictive information by:
converting position coordinates of the detected graphical objects into absolute position coordinates.

\* \* \* \* \*